No. 850,429. PATENTED APR. 16, 1907.
P. GRASSMANN.
PHOTOGRAPHIC PLATE HOLDER.
APPLICATION FILED MAY 5, 1905.
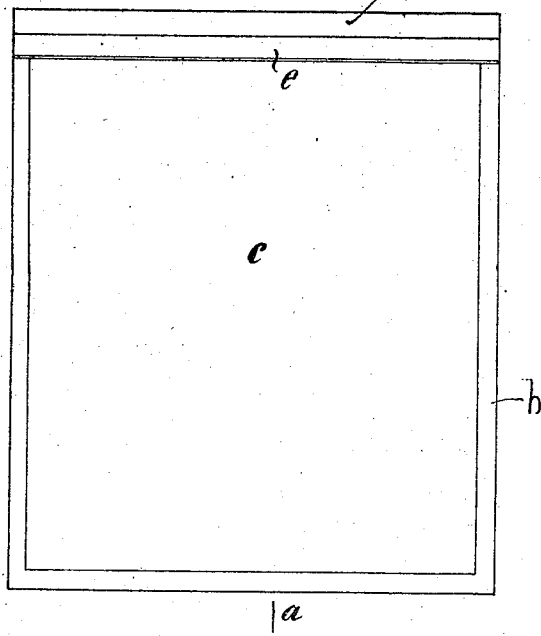
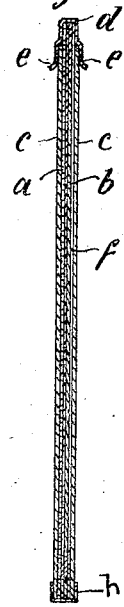
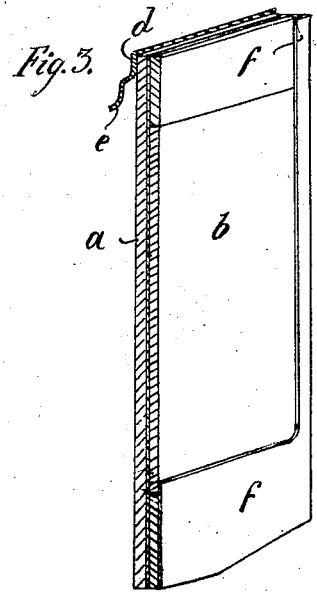
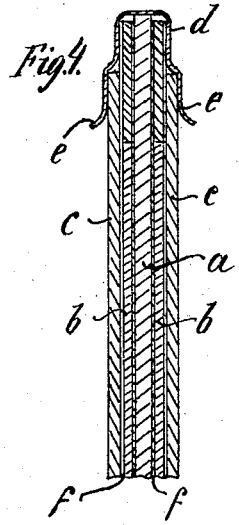
Witnesses
Inventor
Peter Grassmann

UNITED STATES PATENT OFFICE.

PETER GRASSMANN, OF GROSS-LICHTERFELDE-OST, GERMANY.

PHOTOGRAPHIC-PLATE HOLDER.

No. 850,429.     Specification of Letters Patent.     Patented April 16, 1907.

Application filed May 5, 1905. Serial No. 259,030.

*To all whom it may concern:*

Be it known that I, PETER GRASSMANN, mechanical engineer, a subject of the German Emperor, and a resident of No. 2 Blumenstrasse, Gross-Lichterfelde-Ost, in the State of Prussia and Empire of Germany, have invented certain new and useful Improvements in Photographic-Plate Holders; and I do hereby declare that the following is a full, clear, and exact specification thereof.

The invention relates to photographic-plate holders for use with glass plates, flat films, or negative-paper, which likewise forms the receptacle in which said plates or films are sold.

The invention consists, broadly, of a plate or film carrier carrying the plate or film in a sort of mask and provided with a retaining-strip, over which carrier a light-tight casing of cardboard or the like, also serving as exposing-slide, is passed in such a manner as to be held under the sides of the retaining-strip, which are bent up on both sides and do thereby provide a reliable light-tight slide or obturating means. The casing, serving also as exposing-slide, is provided with a metal rim for the purpose of increasing its stability, as is necessary in this connection, the edge likewise serving for uniting the two slide-surfaces.

The exposure takes place in a rear light-tight adapter, in which the retaining-strip of the plate or film carrier is suitably supported so as to prevent it from being withdrawn inopportunely.

In the drawings, Figure 1 is a side elevation of the plate-holder. Fig. 2 is a cross-section through the same. Fig. 3 shows the arrangement of the retaining-strip and one plate, and Fig. 4 the same with two plates.

The plate-holder consists of the plate-carrier $a$, upon which one or two photographic plates $b$ are mounted by means of a mask $f$ and at the end of which a retaining-strip $d$ is provided. Over the carrier $a$ is passed a light-tight casing $c$, the lateral members of which are held under the turned-up sides $e$, which are likewise specially shaped at the end in order to facilitate the insertion. The casing $c$ is provided with a metal rim $h$, by means of which its members are given the stability required for the purpose of inserting it, this rim $h$ also permitting of uniting these members one with the other more readily.

The adapter serving for the exposure must be provided with a stop upon which the edges $e$ of the retaining-strip $d$ may find a bearing, so that when the casing $c$ is withdrawn the carrier $a$ may be prevented from coming with it.

In order to make the exposure, the light-tight casing $c$ is drawn down from off the plate or film carrier $a$, and after the exposure has been made the casing is again pushed over the carrier until the slide members have been firmly inserted beneath the sides $e$ of the retaining-strip $d$.

Having now particularly described my said invention, what I claim as new, and desire to secure by United States Letters Patent, is—

1. A photographic-plate holder comprising a carrier and provided with a mask $f$, a retaining-strip $d$ secured to the top edge of said holder and projecting outwardly and downwardly and a casing of light-proof material slidable over said holder and having its end edges adapted to pass under the edges of the retaining-strip.

2. A photographic-plate holder comprising a carrier made of cardboard, a metal strip secured to the top edge thereof, said strip having projecting edges and a casing also made of cardboard sliding over said carrier and having its end edges passing under the edges of the metal strip said casing having its edges bound in metal.

In witness whereof I have hereunto set my hand in presence of two witnesses.

PETER GRASSMANN.

Witnesses:
     WOLDEMAR HAUPT,
     HENRY HASPER.